United States Patent
Lee et al.

(10) Patent No.: US 6,257,650 B1
(45) Date of Patent: Jul. 10, 2001

(54) AUTOMOBILE PROVIDED WITH MOVABLE ROOF

(75) Inventors: Bernard G. Lee, Los Angeles; Donald M. Herner, Placentia, both of CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,213

(22) Filed: Oct. 13, 1999

(51) Int. Cl.$^7$ ........................................................ B60J 7/00
(52) U.S. Cl. ................................ 296/107.16; 296/107.01; 296/107.17
(58) Field of Search ........................ 296/107.01, 107.08, 296/107.16, 107.17

(56) References Cited

U.S. PATENT DOCUMENTS

| | | | | |
|---|---|---|---|---|
| D. 184,043 | * | 12/1958 | Dodge | 296/107.17 X |
| 3,278,221 | * | 10/1966 | Jaulmes | 296/107.17 X |
| 3,823,977 | * | 7/1974 | Fioravanti | 296/107.17 X |
| 4,750,778 | * | 6/1988 | Hoban | 296/107.17 X |
| 4,805,956 | * | 2/1989 | Saunders | 296/107.17 X |
| 5,098,148 | * | 3/1992 | Hoban | 296/107.17 X |
| 6,068,326 | * | 5/2000 | Shiromura | 296/107.16 X |

* cited by examiner

*Primary Examiner*—D. Glenn Dayoan
*Assistant Examiner*—Lori L. Coletta
(74) *Attorney, Agent, or Firm*—Arent Fox Kintner Plotkin & Kahn

(57) ABSTRACT

An automobile including an occupant seat section C and a loading platform section T adjoining a rear side of the occupant seat section is provided with a movable roof R which is selectively movable between a closed position Rs which closes a top opening O in the occupant seat section C, and an opened position Ro which opens the top opening O. The movable roof R covers at least a portion of the loading platform section when the movable roof is in the opened position Ro. Thus, in a state in which the movable roof R has been retained in the opened position to open the top opening O in the occupant seat section C, at least a part of loads within the loading platform section T can be covered with the roof R and hence, it is possible to effectively prevent such loads from being exposed to direct sunlight and from flying out of the loading platform section. Moreover, the structure is simplified by utilizing the movable roof for the occupant seat section as a protecting cover for the loading platform section, which contributes to a reduction in cost and the like.

2 Claims, 5 Drawing Sheets

AUTOMOBILE PROVIDED WITH MOVABLE ROOF

BACKGROUND OF THE INVENTION

1. Field of the Invention

The present invention relates to a so-called truck-type automobile including an occupant seat section and a loading platform or deck section adjoining a rear side of the seat section, and particularly, to an automobile provided with a movable roof which is capable of opening and closing a top opening formed in the occupant seat section.

2. Description of the Related Art

In a conventional automobile of the above truck type, no cover is provided on an opened upper surface of the loading platform section, and loads are placed within the loading platform section in an exposed state.

In an open or convertible-type automobile in which a top opening in an occupant seat section is opened and closed by a movable roof, the roof, when it is not in service, is enclosed within a vehicle body, and is not utilized as a cover and the like, for its trunk section.

In the above truck-type automobile, loads are placed within the loading platform section in the exposed state. For this reason, it is necessary to specially cover the loads with an exclusive protecting cover in order to prevent their flying out of the platform section or to protect the loads from direct sunlight, and hence, the cost is increased correspondingly, and the handling operation of the protecting cover and the management of the cover when not in service are troublesome.

SUMMARY OF THE INVENTION

Accordingly, it is an object of the present invention to provide an automobile with a movable roof, wherein a movable roof for opening and closing an top opening of an occupant seat section is constructed so that it can also be used as a protecting cover for a loading platform section, thereby solving the above problem.

To achieve the above object, according to a first aspect and feature of the present invention, there is provided an automobile provided with a movable roof, including an occupant seat section, and a loading platform section adjoining a rear side of the occupant seat section, the automobile comprising a movable roof which is selectively movable between a closed position which closes a top opening in the occupant seat section, and an opened position which opens the top opening, the movable roof covering at least a portion of the loading platform section at the opened position.

With this feature, in a state in which the movable roof has been retained in the opened position to open the top opening in the occupant seat section, at least a part of loads within the loading platform section can be covered with the roof and hence, it is possible to effectively prevent such loads from being exposed to direct sunlight and from flying out of the loading platform section. Moreover, the structure is simplified by utilizing the movable roof for the occupant seat section as a protecting cover for the loading platform section, which contributes to a reduction in cost and the simplification of the handling operation. In addition, the movable roof in the opened position is located above the loading platform section and hence, the movable roof can be utilized as a rear spoiler by properly selecting the shape of the roof, thereby preventing the traveling wind from entering into the loading platform section to alleviate the resistance to the traveling of the vehicle.

According to a second aspect and feature of the present invention, in addition to the first feature, a roof guide mechanism is provided between the movable roof and a vehicle body for guiding and moving the movable roof between the closed position and the opened position. With this feature, the movable roof is guided and moved smoothly along a constant rout between the closed position and the opened position and hence, the opening and closing motions of the roof can be conducted easily and precisely.

According to a third aspect and feature of the present invention, in addition to the second feature, the roof guide mechanism includes four front, rear, left and right arms which are connected at their upper ends to an inner surface of the movable roof for longitudinal pivotal movement with longitudinal and lateral distances provided between the upper ends, and at their lower ends to the vehicle body for longitudinal pivotal movement with longitudinal and lateral distances provided between the lower ends, so that the movable roof is swung longitudinally between the closed position and the opened position. With this feature, the movable roof can be swung longitudinally between the closed position and the opened position through the front, rear, left and right arms interposed between the movable roof and the vehicle body. Therefore, the movable roof can be moved lightly between the opened position and the closed position with an alleviated resistance to the movement of the roof. Moreover, the locus of movement of the roof can be curved upwards at an intermediate portion between the opened position and the closed position and hence, even if a protrusion such as roll bar is located at a boundary between the occupant seat section and the loading platform section, the movable roof can be moved in a single motion between the closed position and the opened position without difficulty while detouring the protrusion.

BRIEF DESCRIPTION OF THE DRAWINGS

In the attached drawings.

DESCRIPTION OF THE PREFERRED EMBODIMENT

The present invention will now be described by way of an embodiment with reference to FIGS. 1 to 5.

Figure 1:
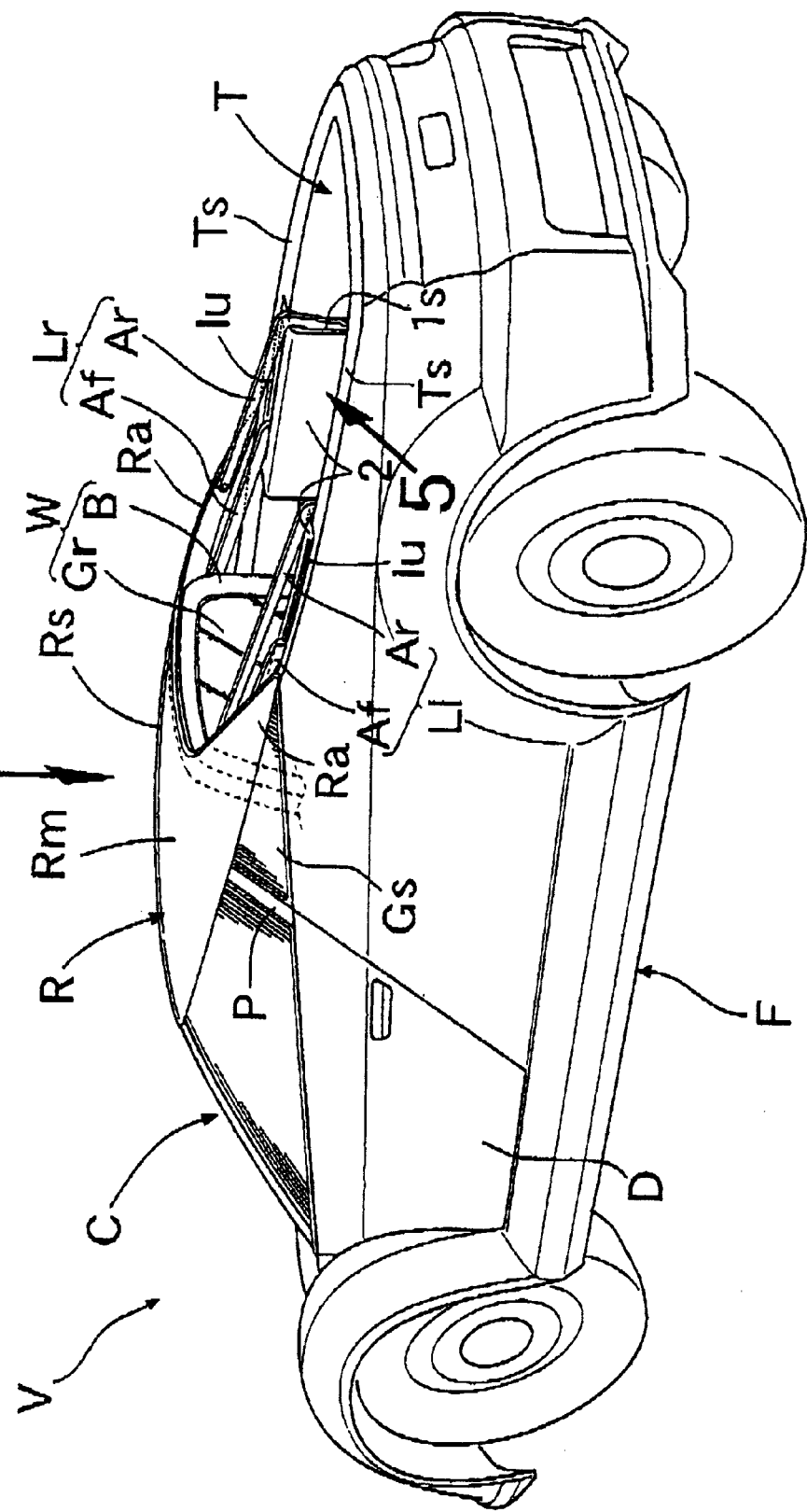
FIG. 1 is a perspective view of an automobile according to an embodiment of the present invention.
Figure 2:
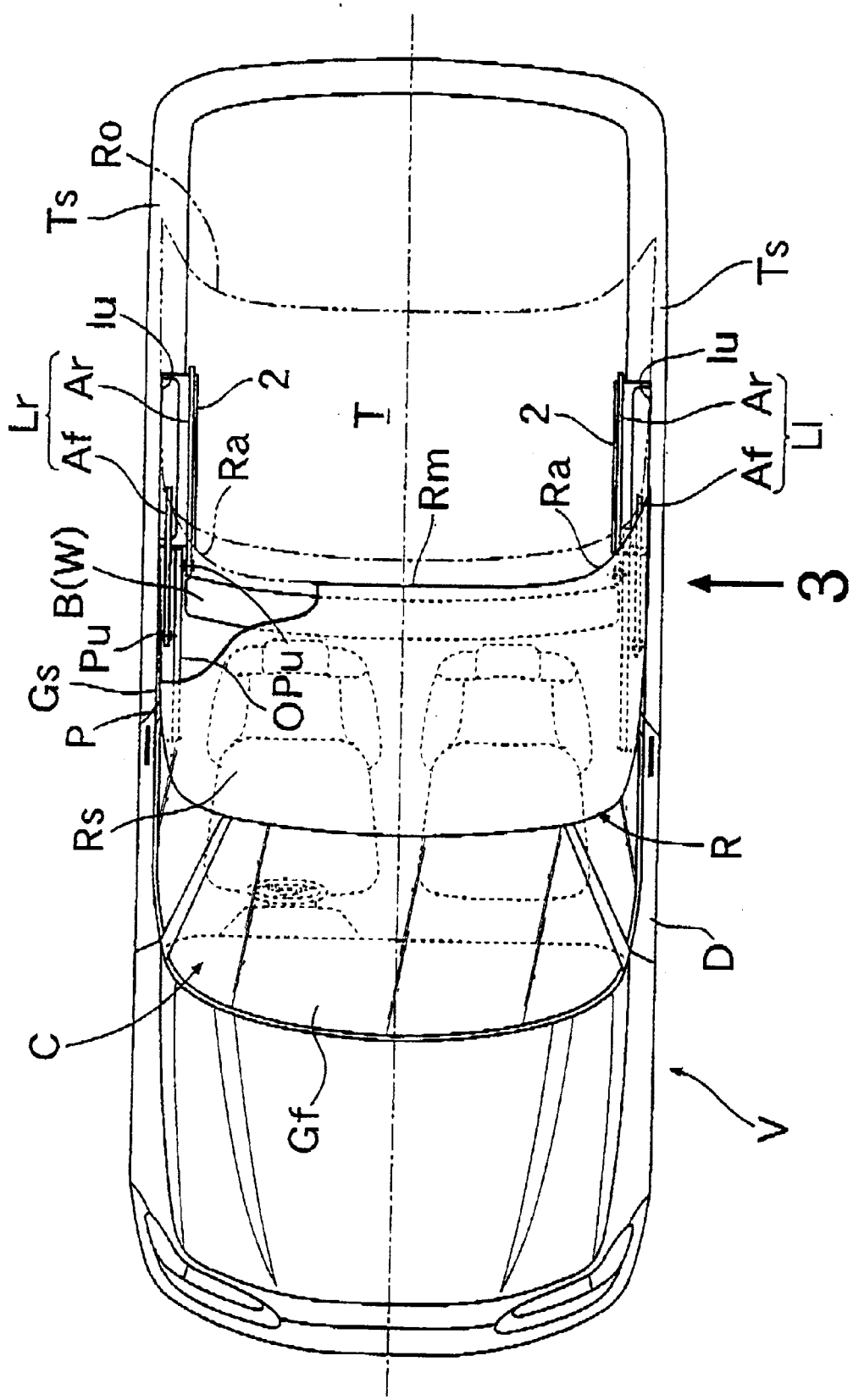
FIG. 2 is a plan view taken in the direction of an arrow 2 in FIG. 1.

Referring to FIG. 1, an automobile V is of a so-called truck type including a two-occupant seat section C and a loading platform section T adjoining a rear portion of the occupant seat section C. The loading platform section T is comprised of a space having an opened upper surface and defined in an upper surface of the rear half of a vehicle body F, and loads can be accommodated in the loading platform section T.

The front side of the occupant seat section C is covered with a front windshield Gf, and a pair of left and right openable and closable side-doors D are provided on opposite left and right sides of the occupant seat section C. Further, a boundary wall or bulkhead W is provided between the occupant seat section C and the loading platform section T, and comprised of an arch-shaped roll bar B and a rear windshield Gr adjoining the inside of the roller bar B.

A top opening O in the occupant seat section C can be opened and closed at any time by a movable roof R. The movable roof R is comprised of a roof body portion Rm having a shape corresponding to the top opening O, and a pair of left and right convergent tail portions Ra extending rearwards from opposite left and right sides of a rear end edge of the body portion Rm. Triangular embedded side windshields Gs are fixed to the vehicle body F adjacent pillars P at rear end edges of the side doors D to extend rearwards along the tail portions Ra, respectively.

The movable roof R is selectively movable between a closed position Rs which closes the top opening O in the occupant seat section C, and an opened position Ro which opens the opening O. In a state in which the movable roof R is in the opened position Ro, the movable roof R functions as a protecting cover for covering a portion of the loading platform section T. Provided between the movable roof R and the vehicle body F are a closed-position maintaining means capable of locking the roof R in the closed position Rs at any time, and an opened-position maintaining means capable of locking the roof R in the opened position at any time (both not shown).

Figure 3:
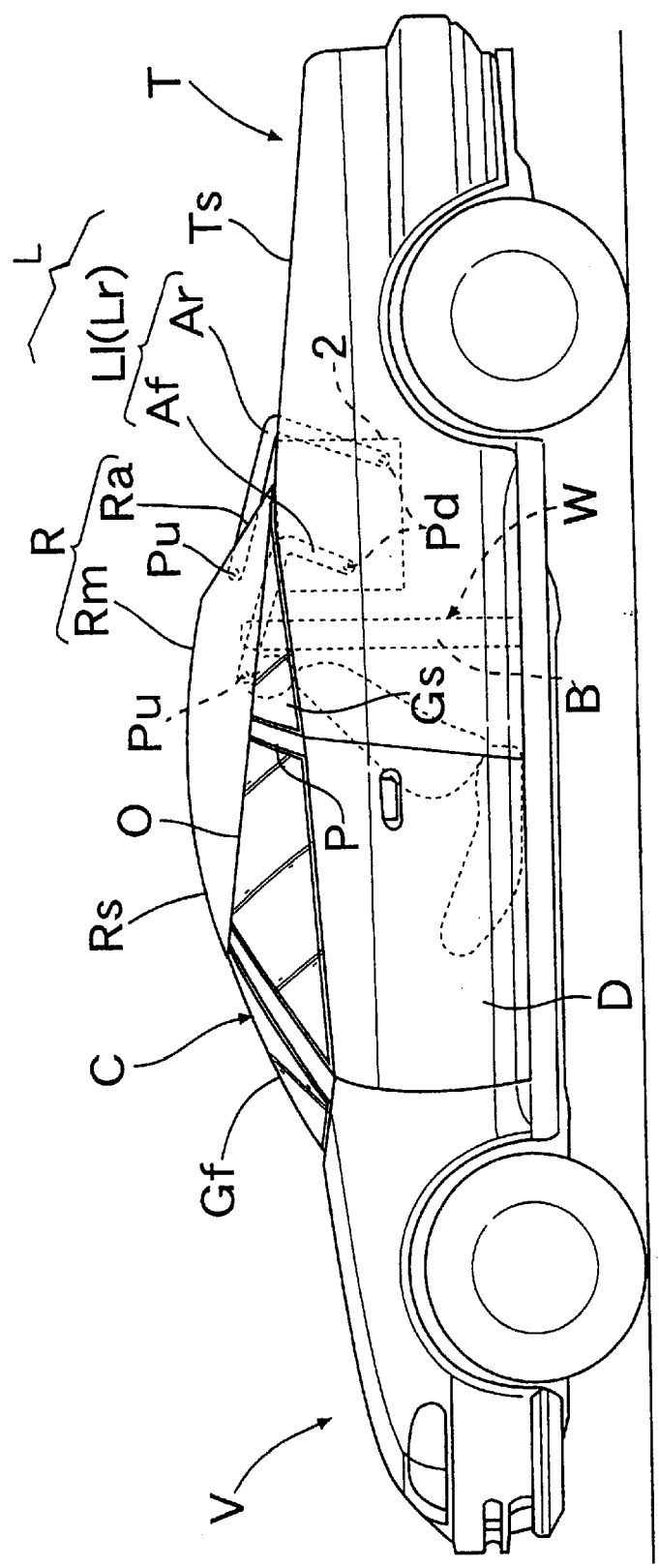
FIG. 3 is a side view taken in the direction of an arrow 3 in FIG. 2.
Figure 4:
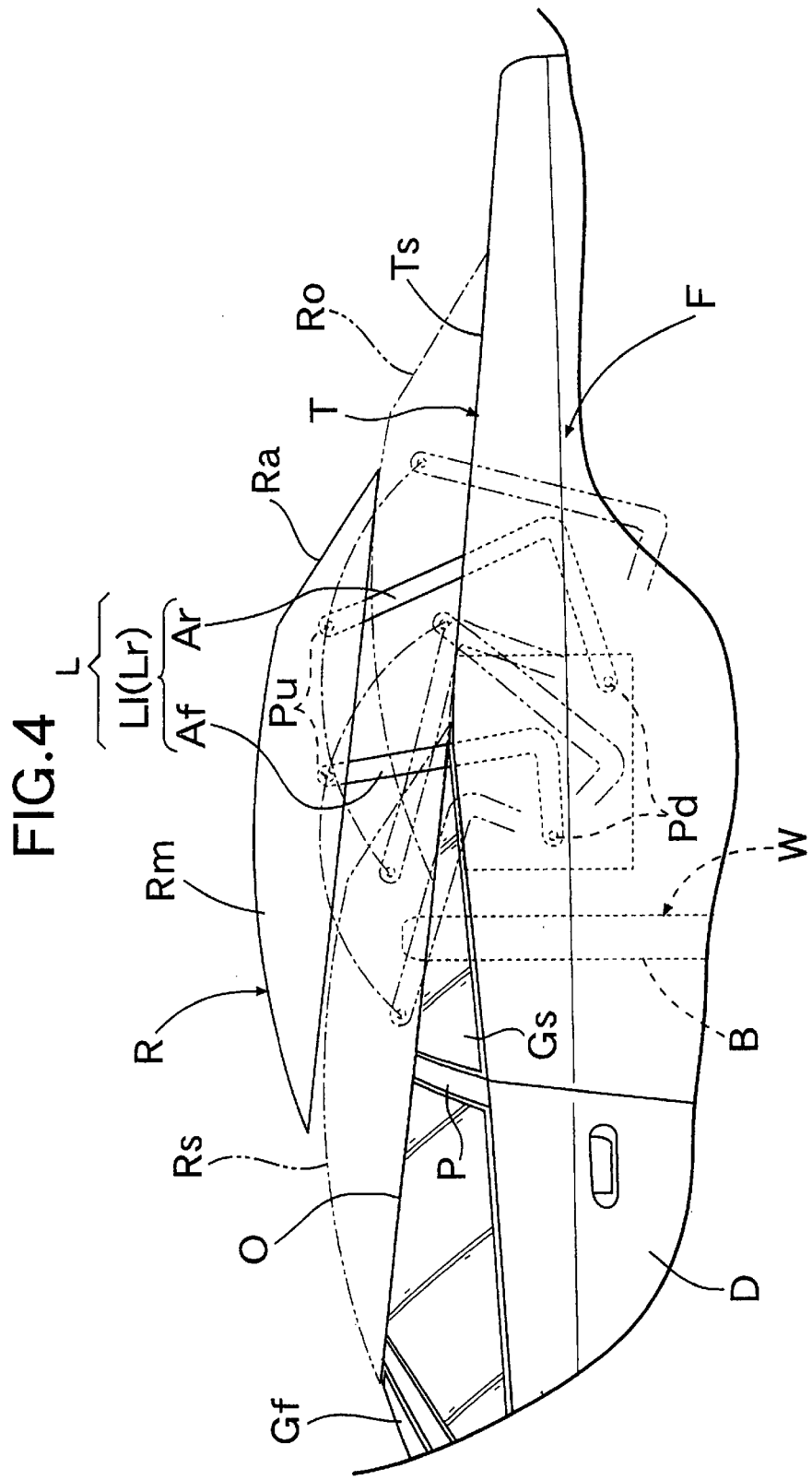
FIG. 4 is an enlarged side view of an essential portion for explaining the movement of a movable roof.

As shown in FIGS. 3 and 4, a roof guide mechanism L is provided for guiding the movement of the roof R between the closed position Rs and the opened position Ro while avoiding interfere with the boundary wall W (i.e., the roll bar B). In the illustrated embodiment, the roof guide mechanism L is comprised of a set of left and right link mechanisms Ll and Lr which operatively connect the opposite left and right sides of the movable roof R and left and right sidewalls Ts of the loading platform section T to each other. Each of the left and right link mechanisms Ll and Lr is comprised of front and rear arms Af and Ar which are connected at their upper ends at a longitudinal distance to an inner surface of each of the sides of the movable roof R for longitudinally pivotal movement by pivots Pu and Pd at their lower ends at a longitudinal distance to an inner surface of each of the left and right sidewalls Ts of the loading platform section T for longitudinal pivotal movement by pivots Pd. Each of the arms Af and Ar is formed into an L-shape with its intermediate portion bent in the illustrated embodiment. The bent intermediate portion is disposed to face rearwards. Alternatively, each of the arms may be formed into an arcuate shape or another shape, if there is not a problem of interference with various portions of the vehicle body.

The link mechanism Ll and Lr ensure that the resistance to the movement of the roof R is alleviated effectively, as compared with a case where the movable roof R is slid longitudinally, and hence, the roof R can be moved lightly between the opened position Ro and the closed position Rs. Moreover, as can be seen from FIG. 4, the locus of movement of the movable roof R can be bulged or curved upwards in the middle between the opened position Ro and the closed position Rs. Therefore, even if a protrusion such as the roll bar R or the like is provided at a boundary between the occupant seat section C and the loading platform section T, the roof R can be moved without difficulty around the protrusion between the closed position Rs and the opened position Ro.

An upper half of each of the left and right front arms Af extends upwards with a forward-inclined attitude through an upper longitudinally-elongated and upward-turned bore $1u$ provided in an upper end face of each of the left and right sidewalls Ts of the loading platform section T. A lower half of each of the left and right rear arms Ar extends upwards with a rearward-inclined attitude through a vertically-elongated and rearward-turned side bore is provided in an inner surface of each of the left and right sidewalls Ts of the loading platform section T, and an upper half of each of the left and right rear arms Ar extends upwards with a forward-inclined attitude, as does the upper half of the front arm Af. When the movable roof R is in the closed position Rs or in the vicinity of the closed position Rs, the upper half of the front arm Af extends through a clearance between each of the left and right sides of the boundary wall W and an inner surface of the side windshield Gs and hence, the interference of the front arm Af with the boundary wall W is avoided.

Figure 5:
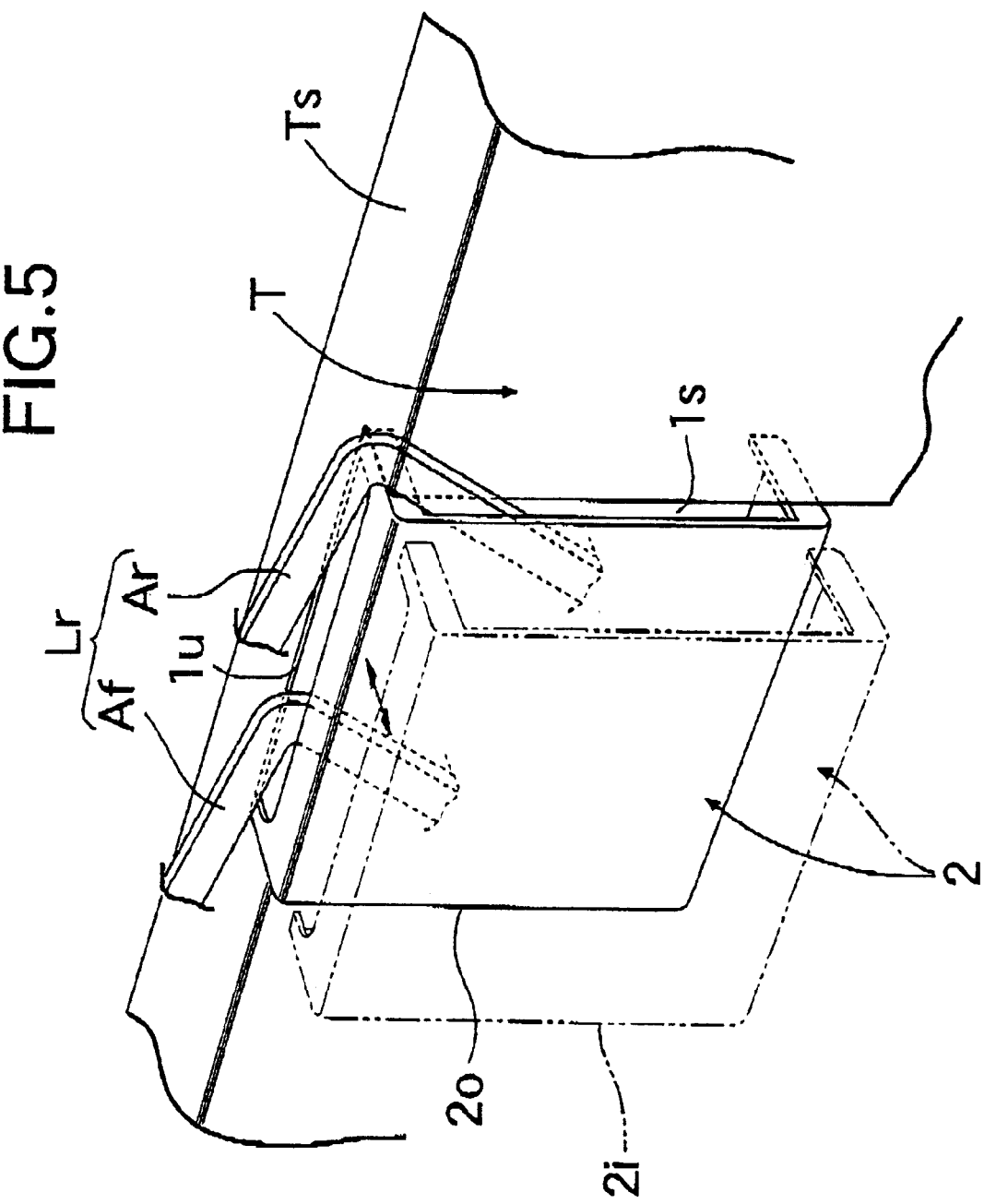
FIG. 5 is an enlarged view taken in the direction of an arrow 5 in FIG. 1.

As best shown in FIG. 5, an arm cover 2 is mounted for reciprocal movement in a lateral direction of the vehicle body on each of the sidewalls Ts at a location inside each of the upper and side elongated bores $1u$ and $1s$ in such a manner that its upper and rear end edges define opened side edges of the upper and side bores $1u$ and $1s$.

When the movable roof R is in the closed position Rs, and the arm cover 2 and its surrounding portions are not covered with the movable roof R, i.e., exposed to the outside, the elongated bores $1u$ and $1s$ can be kept inconspicuous in appearance by retaining the cover 2 in an outer limit position $2o$ in which the cover 2 is substantially flush with an outer surface of the adjacent sidewall Ts to make the widths of the elongated bores $1u$ and $1s$ minimum. On the other hand, when the movable roof R is in the opened position Ro, the movements of the front and rear arms Af and Ar caused with the opening and closing motions of the movable roof R can be permitted unstrainedly by retaining the arm cover 2 in an inner limit position $2i$ in which the cover 2 is spaced sufficiently apart from the outer surface of the adjacent sidewall Ts to make the widths of the elongated bores $1u$ and $1s$ maximum. At this time, the whole or most of each of the arm cover 2 and the elongated bores $1u$ and $1s$ is covered with the movable roof R which is in the opened position Ro. Therefore, even if the cover 2 is opened to a large extent, the appearance and decency cannot be injured, and the entering of rain or the like into the elongated bores $1u$ and $1s$ is avoided effectively. The arm cover 2 may be operatively associated with the opening and closing swinging movements of the movable roof R by an interlocking mechanism (not shown) provided between the arm cover 2 and each of the link mechanisms Ll and Lr, or may be constructed so that it can be opened and closed independently from the movement of the roof R.

The operation of the embodiment will be described. In a state in which the movable roof R has been moved to and retained in the opened position Ro to open the top opening O in the occupant seat section C, a part of loads (the front half in the illustrated embodiment) of the loading platform section T can be covered with the roof R. Therefore, it is possible to effectively prevent the loads from being exposed to direct sunlight, or being flied out of the loading platform section. Moreover, since the movable roof R for opening and closing the top opening O of the occupant seat section C also serves as the protecting cover for the loading platform section T, the structure is simplified. This contributes to a reduction in cost and the simplification of the handling operation.

In addition, the movable roof R in the opened position Ro is located above the loading platform section T and hence, if the shape of the roof R is selected to be suitable for a spoiler as in the illustrated embodiment, the roof R can be utilized as the spoiler, thereby preventing the travel wind from entering into the loading platform section T and alleviating the resistance to the traveling of the vehicle.

The movable roof R is supported on the vehicle body F through the pair of left and right link mechanisms Ll and Lr each comprised of the front and rear arms Af and Ar, and is swung and guided longitudinally between the closed position Rs and the opened position Ro. Therefore, the locus of movement of the movable roof R can be set into a desired curved shape bulged upwards at an intermediate portion between the opened position Ro and the closed position Rs by properly selecting the shapes and structures of the link mechanisms Ll and Lr. Thus, even if the protrusion such as the roll bar B is provided at the boundary between the occupant seat section C and the loading platform section T, the movable roof R can be moved without difficulty around the protrusion.

Although the embodiment of the present invention has been described, it will be understood that the present invention is not limited to the above-described embodiment, and various modifications in design may be made without departing from the spirit and scope of the invention defined in claims. For example, a portion of the loading platform section T is covered with the movable roof R which is in the opened position Ro in the embodiment, but according to the present invention, the entire loading platform section T may be covered with the movable roof R, depending on the shapes of the movable roof R and the loading platform section T.

In addition, the movement of the movable roof R is guided by the roof guide mechanism L in the embodiment, but according to the present invention (claim 1), such roof guide mechanism may be omitted, and the movable roof R may be moved manually between the opened position Ro and the closed position Rs.

In the embodiment, the link mechanisms Ll and Lr each comprised of the set of front and rear arms Af and Ar are used as the roof guide mechanism, so that the movable roof R is moved between the opened position Ro and the closed position Rs around the movable obstacle such as roll bar B between the occupant seat section C and the loading platform section T. However, according to the present invention (claim 2), if a movable obstacle as described above is not present between the occupant seat section C and the loading platform section T, there may be used a slide mechanism for sliding the movable roof R reciprocally and rectilinearly between the opened position Ro and the closed position Rs as a roof guide mechanism.

The movable roof R is moved manually between the opened position Ro and the closed position Rs in the embodiment, but according to the present invention, the movable roof R may be forcibly moved by use of an electric motor or another actuator provided between the movable roof R (at least one of the arms Af and Ar) and the vehicle body F(such arm may be forcibly rotated).

Further, one row of seats is shown as being provided in the occupant seat section C in the embodiment, but a plurality of rows of seats may be placed longitudinally in the occupant seat section C.

What is claimed is:

1. An automobile provided with a movable roof, including an occupant seat section, and a loading platform section adjoin a rear side of said occupant seat section, said automobile comprising a movable roof which is selectively movable between a closed position which closes a top opening in said occupant seat section and an opened position which opens said top opening, said movable roof covering at least a portion of said loading platform section at said opened position and covers at least an additional portion of said loading platform section in the closed position, and a roof guide mechanism provided between said movable roof and a vehicle body and positioned behind the occupant seat section for guiding and moving said movable roof between said closed position and said opened position.

2. An automobile provided with a movable roof according to claim 1, wherein said roof guide mechanism includes front, rear, left and right arms which are connected at their upper ends to an inner surface of said movable roof for longitudinal pivotal movement with longitudinal and lateral distances provided between said upper ends, and their lower ends to said vehicle body for longitudinal pivotal movement with longitudinal and lateral distances provided between said lower ends, so that said movable roof is swung longitudinally between said closed position and said opened position.

* * * * *